US009703501B2

(12) United States Patent
Hom et al.

(10) Patent No.: US 9,703,501 B2
(45) Date of Patent: Jul. 11, 2017

(54) VIRTUAL STORAGE INSTRUMENTATION FOR REAL TIME ANALYTICS

(71) Applicant: International Business Machines Corporation, Armonk, NY (US)

(72) Inventors: David Hom, Poughkeepsie, NY (US); Paula M. Spens, Poughkeepsie, NY (US); Scott B. Tuttle, Staarsburg, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/870,124

(22) Filed: Sep. 30, 2015

(65) Prior Publication Data
US 2017/0090808 A1 Mar. 30, 2017

(51) Int. Cl.
*G06F 12/12* (2016.01)
*G06F 3/06* (2006.01)

(52) U.S. Cl.
CPC .......... *G06F 3/0631* (2013.01); *G06F 3/0604* (2013.01); *G06F 3/0638* (2013.01); *G06F 3/0653* (2013.01); *G06F 3/0665* (2013.01); *G06F 3/0673* (2013.01)

(58) Field of Classification Search
CPC ..... G06F 3/0631; G06F 3/0604; G06F 3/0673
USPC ....................................................... 711/170
See application file for complete search history.

(56) References Cited

U.S. PATENT DOCUMENTS

| 5,790,852 | A | 8/1998 | Salm |
| 6,125,430 | A | 9/2000 | Noel et al. |
| 6,427,195 | B1* | 7/2002 | McGowen ............ G06F 9/5016 |
| | | | 711/153 |
| 6,981,125 | B2 | 12/2005 | Emmes |
| 7,523,286 | B2 | 4/2009 | Ramany et al. |
| 8,539,137 | B1 | 9/2013 | Protassov et al. |
| 8,819,230 | B2 | 8/2014 | Nahum et al. |
| 9,298,600 | B2* | 3/2016 | Bentz ................... G06F 12/0223 |
| 2009/0172259 | A1* | 7/2009 | Prins ................... G06F 13/1657 |
| | | | 711/103 |
| 2012/0005307 | A1 | 1/2012 | Das et al. |

OTHER PUBLICATIONS

David Hom et al., "Virtual Storage Instrumentation for Real Time Analytics", U.S. Appl. No. 15/068,826, filed Mar. 14, 2016.
List of IBM Patents or Patent Applications Treated as Related; (Appendix P), Filed May 10, 2016; 2 pages.

* cited by examiner

Primary Examiner — Jae Yu
(74) Attorney, Agent, or Firm — Cantor Colburn LLP; William A. Kinnaman, Jr.

(57) ABSTRACT

Technical solutions for providing real time analytics of a private area of a virtual address space are described. One general aspect includes a method that includes determining, by a processor, a start address and a size of the private area of the virtual address space. The method also includes determining, by the processor, a highest address corresponding to a user region of the private area. The method also includes determining, by the processor, a lowest address corresponding to a high-end region of the private area. The method also includes storing, by the processor, the determined information in a common area outside the virtual address space.

10 Claims, 4 Drawing Sheets

VIRTUAL STORAGE INSTRUMENTATION FOR REAL TIME ANALYTICS

BACKGROUND

The present application relates to computer technology, and particularly to virtual memory management, such as by an operating system.

Applications, such as computer programs, executing on a computer, have many different modes of handling virtual storage. An application obtains and releases virtual storage via system calls, and relies on the computer to manage the virtual storage. Typically, an operating system of the computer manages allocation and freeing of the virtual storage. For example, the operating system manages an association of a virtual memory frame and a corresponding real frame, the real frame being a memory space in storage of the computer. The operating system may also manage swapping the real frames in and out of the storage.

SUMMARY

One general aspect includes a method for providing real time analytics of a private area of a virtual address space. The method includes determining, by a processor, a start address and a size of the private area of the virtual address space. The method also includes determining, by the processor, a highest address corresponding to a user region of the private area. The method also includes determining, by the processor, a lowest address corresponding to a high-end region of the private area. The method also includes storing, by the processor, the determined information in a common area outside the virtual address space.

Another general aspect includes a system that includes a memory and a processor. The system also includes a virtual storage manager that manages a private section of a virtual address space allocated for a first application. The virtual storage manager determines a highest address corresponding to a user region of the private section. The virtual storage manager determines a lowest address corresponding to a high-end region of the private section. The virtual storage manager stores the determined information in a common area, the common area being accessible by a second application.

Yet another general aspect includes a computer product for providing real time analytics of a private section of a virtual address space, the computer product including a non-transitory computer readable storage medium that includes computer executable instructions. The non-transitory computer readable storage medium includes instructions to determine a start address and a size of the private section of the virtual address space, where that private section is accessible only by an application to which the virtual address space is assigned. The non-transitory computer readable storage medium includes instructions to determine a highest address corresponding to a user region of the private section, where the user region is a portion of the private section that is used for storing data and running programs in the virtual address space. The non-transitory computer readable storage medium includes instructions to determine a lowest address corresponding to a high-end region of the private section, where the high-end region is a portion of the private section that is used for storing data structures associated with the virtual address space. The non-transitory computer readable storage medium includes instructions to store the determined information in a common area outside the virtual address space.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Applications, such as computer programs, executing on a computer, have many different modes of handling virtual storage. Generally speaking, applications obtain and release virtual storage via system calls, and rely on the computer to manage the virtual storage. Typically, an operating system of the computer manages allocation and freeing of the virtual storage. For example, the operating system manages an association of a virtual memory frame and a corresponding real frame, the real frame being a memory space in storage of the computer. The operating system may also manage swapping the real frames in and out of the storage. Without a precise analysis and prediction of virtual storage availability the operating system may exhaust memory space available for allocation. The examples described herein provide technical solutions to gather real time analytics of the virtual storage, particularly a private area of a virtual address space, in response to requests for allocation and release of memory in the virtual address space. The technical solutions, thus, facilitate predictive analytic tools to make accurate real time decisions that help avoid application and system failures.

For example, in a computer such as a server, a desktop computer, a laptop computer, or any other computer, a processor executes multiple applications simultaneously. The operating system allocates each application a corresponding user addressable address space in the virtual memory. The operating system manages such a virtual address space for the application. For example, the application requests the operating system to allocate and free (or deallocate or release) a memory buffer any time the application is in need of memory space for its operation. In response to the request, the operating system may manage a mapping between the virtual memory and physical memory.

Figure 1:
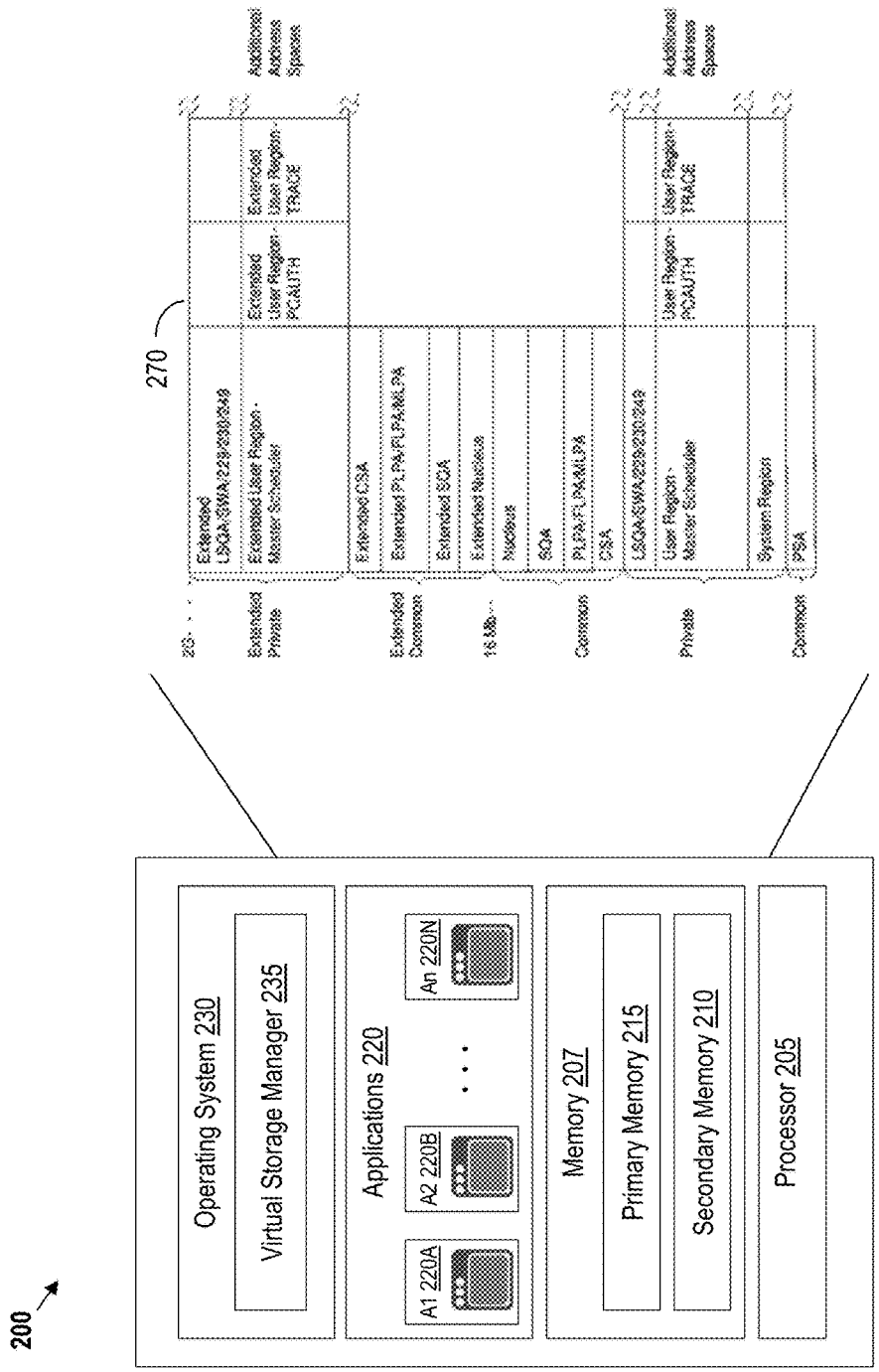
FIG. 1 illustrates an example processing system that uses virtual memory management.

FIG. 1 illustrates an example system that uses virtual memory management. A system 200 is shown that includes a processor 205, and a memory 207. The memory 207 includes a secondary memory 210 and a primary memory 215. The system 200 may execute one or more applications 220, and an operating system 230 may manage operations of the system 200. The system 200 may include other components such as a communication interface, an input device (such as a keyboard, a mouse, a touchscreen), an output device (such as a display, a printer), and other electronic circuitry not shown in FIG. 1.

The processor 205 is a central processor of the system 200, and is responsible for execution of the operating system 230, the applications 220, and any other executable instructions. The processor 205 is operable to execute logic. The logic includes computer executable instructions or computer code embodied in the memory 207 or in other memory that when executed by the processor 205, cause the processor 205 to perform the features implemented by the logic. The computer code includes instructions executable with the processor 205. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 205 may be a general processor, central processing unit, server, application specific integrated circuit (ASIC), digital signal processor, field programmable gate array (FPGA), digital circuit, analog circuit, or combinations thereof. The processor 205 is in communication with the memory 207, the operating system 230, and the applications 220, and other components of the system 200.

The memory 207 includes non-transitory computer readable storage medium. The memory 207 stores control instructions and data of the operating system 230 and the applications 220 that are executable by the processor 205. In addition, the memory 207 may contain other data such as images, videos, documents, spreadsheets, audio files, and other data that may be associated with operation of the system 200.

The memory 207 includes the primary memory 215, which is volatile memory such as dynamic random-access memory (DRAM), static random-access memory (SRAM), or any other type of volatile memory or a combination thereof. The memory 207 also includes the secondary memory 210, which is non-volatile memory such as hard disks, magnetic tape, flash memory, or any other type of non-volatile memory or combination thereof.

The applications 220 include software applications A1-An 220A to 220N. The processor 205 may be executing the applications 220. The operating system 230 is responsible for managing the operations of the system 200. The operating system 230 may be any operating system such as Z/OS™, WINDOWS™, LINUX™, OS/X™, or any other operating system.

The operating system 230 allocates a virtual address space from a virtual storage 270 to a corresponding application. The virtual storage 270 is the span of memory addresses available to the processor with a dynamic address translation (DAT) feature enabled. The operating system 230 includes a virtual storage manager (VSM) 235. The VSM 235 supervises the user addressable virtual storage 270.

Figure 2:
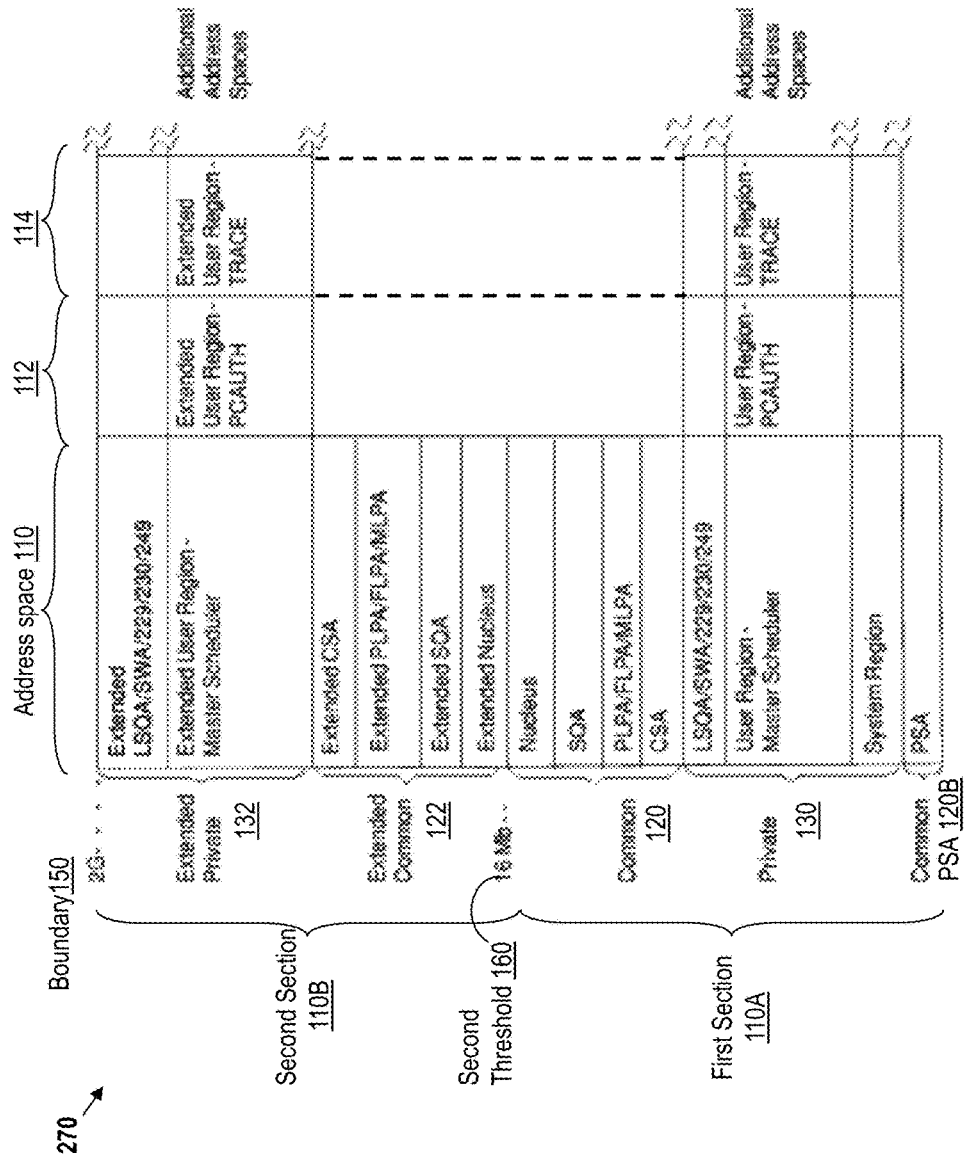
FIG. 2 illustrates a virtual storage in accordance with an exemplary embodiment.

FIG. 2 illustrates an example virtual storage 270. The virtual storage 270 includes user addressable virtual address spaces 110, 112, and 114. Each user addressable virtual storage space 110, 112, and 114 is of the same size based on the boundary 150. For example, the VSM 235 may control use of memory addresses that are below the boundary. In the illustrated example, the VSM 235 has a predetermined boundary of 2 G. In another example operating system, the VSM 235 may manage a user addressable virtual storage that is 4 GB in size. The size of the user addressable virtual storage 110 managed by the VSM 235 may be user configurable. For example, a number of bits used by the VSM 235 to address the user addressable virtual storage 110 controls the size of the user addressable virtual storage 110.

The VSM 235 controls a task requests to allocate and free portions of the storage in the user addressable virtual storage 110. The user addressable virtual storage 110 may serve as a master scheduler address space for the operating system 230. Alternatively or in addition, a job entry subsystem (JES) of the operating system 230 may use the user addressable virtual storage 110. In another example, the user addressable virtual storage 110 may be an address space for an operating system component, such as for allocation, system trace, system management facilities (SMF), and dumping services. In yet another example, the user addressable virtual storage 110 may be used for each user of the system in a batch or a time-sharing option/extension (TSO/E) mode.

The user addressable virtual address spaces 110 are each divided into two sections by a second memory threshold 160. In the illustrated case the second memory threshold 160 is at 16 MB. The second memory threshold 160 divides the user addressable virtual storage space 110 into a first section 110A and a second section 110B The first section 110A of the virtual storage space includes a common area 120 and a private area 130 and a common PSA area 120B. The second section 110B includes an extended common area 122 and an extended private area 132. The common area 120 and common PSA area 120B contains system control programs and control blocks such as a Prefixed storage area (PSA), a Common Service Area (CSA), a Pageable Link Pack Area (PLPA), a Fixed Link Pack Area (FLPA), a Modified Link Pack Area (MLPA), a System Queue Area (SQA), and a Nucleus, which is fixed and nonswappable. In the illustrated example, a storage area in the common area 120 (below 16 megabytes) has a counterpart in the extended common area 122 (above 16 megabytes) with the exception of the PSA.

Each user addressable virtual address space 110, 112, and 114 corresponds to a respective application or a respective user. Thus, one or more applications or users share the virtual storage, except the private area 130 and the extended private area 132. In other words, each user addressable virtual address space 110, 112, and 114 uses the same common area 120. Portions of the common area 120 are paged in and out as the demands of the system change and as new user jobs (batch or time-shared) start and old ones terminate. Thus, multiple address spaces share the common area 120 and the extended common area 122, but the address space 110 has its own private area 130 and extended private area 132.

The private area 130 contains a local system queue area (LSQA), a scheduler work area (SWA), subpools 229, 230, and 249 (the authorized user key (AUK) area), a predefined system region area, and either a V=V (virtual=virtual) or V=R (virtual=real) private user region for running programs and storing data. The predefined system region area, in an example, may be 16 K. The private area 130 (except LSQA) is pageable unless a user specifies a V=R region. If assigned as V=R, the actual V=R region area (excluding SWA, the predefined system region area, and subpools 229, 230, and 249) is fixed and nonswappable.

The VSM 235 manages the private area 130 below the second threshold 160 and the extended private area 132 above the second threshold 160, up to the boundary 150. The private area 130 virtual storage use of the user addressable virtual address space 110 may become such that the potential for exhaustion increases and impacts the application that is running in that user addressable virtual address space 110. The exhaustion may result in eventual failures for subsequent storage requests. System address spaces encountering private area storage exhaustion may have an adverse effect on the health of the entire system.

The technical solutions described herein for determining and recording precise virtual storage allocation information for an address space facilitate an accurate analysis and prediction of future exhaustion. Thus, the technical solutions described herein facilitate real time analytics of virtual storage utilization of the user addressable virtual storage 110 that in turn facilitate predictive analytic tools to make accurate real time decisions that help avoid application and system failures.

The VSM 235, in response to a request to obtain or release virtual storage data gathers and makes available real time analytics of the private areas (130 and 132). The operating system 230 uses the analytics data to generate an accurate picture of the growth areas within the private areas at the time of the change in the virtual picture. The analytics data thus facilitates a precise analysis and prediction of virtual storage availability and possible future exhaustion within the user addressable virtual address space 110, and particularly within the private area 130.

Figure 3:
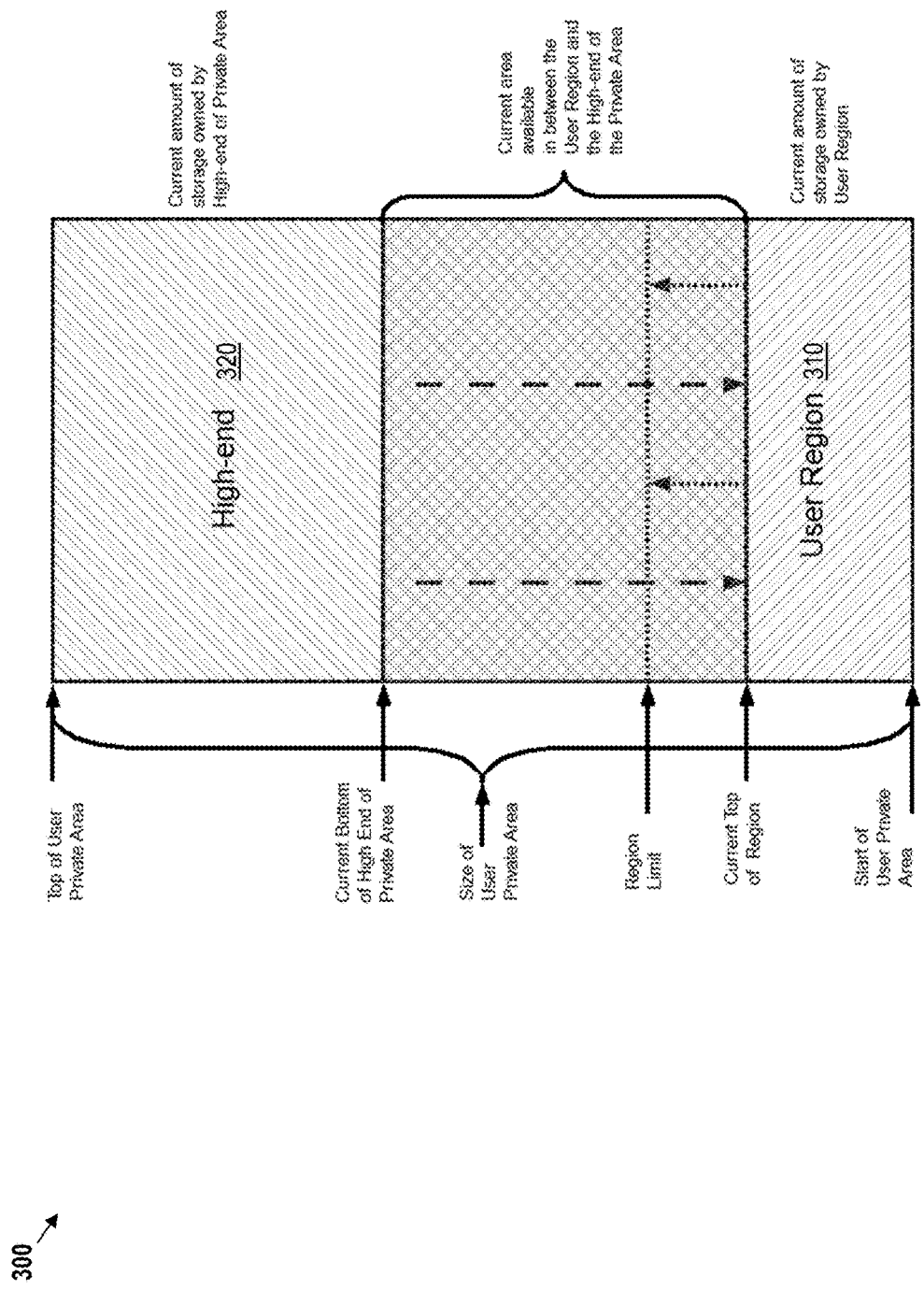
FIG. 3 illustrates a view of a private section of a virtual storage in accordance with an exemplary embodiment.

FIG. 3 illustrates a view of an example private section 300. The private section 300 may be the private area 130 or the extended private area 132. The description herein describes the private area 130, however the description also applies to the extended private area 132.

The private area includes two sections, a user (or low-end region) 310 and a high-end region 320. The user region is used for running programs and storing data. In the user region 310, the VSM 235 allocates storage from the start of the private area and towards the high-end region 320. Thus, in the illustrated example, the VSM 235 allocates storage for the user region 310 in an upward direction. The high-end region 320 contains the areas such as the LSQA, SWA, AUK, and other areas that contain data structures, for example, tables and queues associated with the user addressable virtual address space 110. In the high-end region 320, the VSM 235 allocates storage from the end of the private area 130 towards the user region 310. Thus, in the illustrated example, the VSM 235 allocates storage for the high-end region 320 in a downward direction.

The VSM 235 allocates additional storage for the user region 310 and the high-end region 320 from the area between the two regions. The area between the two regions, as illustrated, encompasses the memory addresses between a current top of the user region 310 and a current bottom of the high-end region 320.

In an example, the VSM 235 allocates storage in the user region 310 until the VSM 235 reaches a predetermined LIMIT value. The LIMIT value may specify a predetermined size of the user region 310. The size of the user region 310 may be configurable respectively for each of applications 220. Alternatively or in addition, the VSM 235 allocates storage in the user region 310 until the VSM 235 reaches an end of the high-end region 320. In the illustration, the end of the high-end region 320 that the VSM 235 detects is a lowest address currently allocated to the high-end region 320.

The VSM 235 allocates storage in the high-end region 320 until the VSM 235 reaches an end of the user region 310. In the illustrated example, the end of the user region 310 that the VSM 235 monitors is a current top of the user region 310. The VSM 235 manages the extended private area 132 in the same manner as the private area 130, dividing the extended private area into a user region and a high-end region.

To provide the analytics data to analyze the availability of storage within the private section 300, and for each of the user region 310 and the high-end region 320 within the private section 300, the VSM 235 captures the analytics data, as it processes each request to obtain or release storage. The analytics data includes a start address of the private area 130. The analytics data also includes a size of the private area 130. The VSM 235 also monitors a current top of the user region 310. The current top of the user region 310, in the illustrated example is a highest address currently owned by the user region 310. The VSM 235 additionally monitors the user region limit for each user addressable virtual address space 110, 112, and 114. The user region limit specifies a highest address the user region 310 is allowed to obtain storage. The VSM 235 also monitors an amount of memory currently owned by (or size of) the user region 310. The VSM 235 also monitors an amount of memory currently owned by (or size of) the high-end region 320 of the private section 300. In addition, the VSM 235 monitors a current bottom of the high-end region 320. The current bottom of the high-end region 320, as illustrated, is a lowest address currently owned by the high-end region 320.

Figure 4:
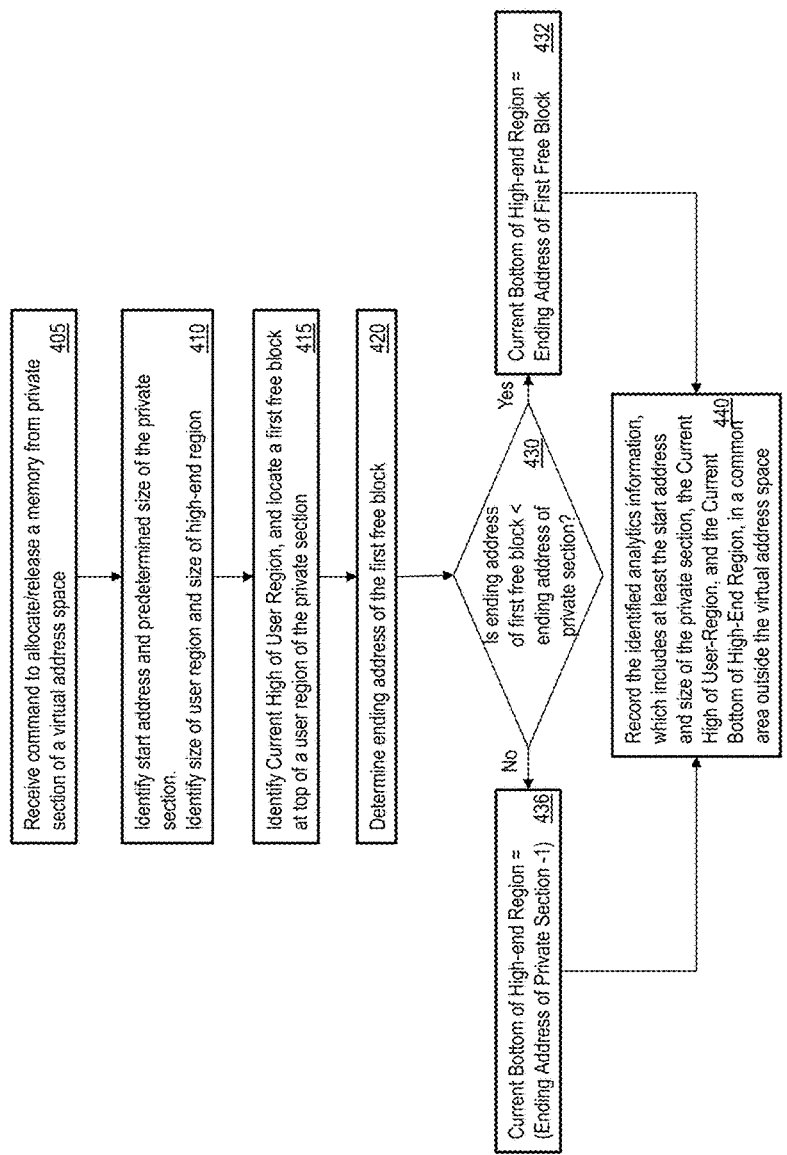
FIG. 4 illustrates a flowchart of example logic for determining analytics related to the private section in accordance with an exemplary embodiment.

FIG. 4 illustrates a flowchart of example logic for determining analytics related to the private section 300. The private section 300 may be the private area 130 or the extended private area 132. The operating system 230, for example via the VSM 235, implements the logic illustrated. The VSM 235 determines the analytics in response to a request to allocate and/or release memory from the private section 300 of the user addressable virtual address space 110, as shown at block 405. The VSM 235 identifies the starting address and a size of the private section 300, as shown at block 410. The VSM 235 also determines size of the user region 310 and the size of the high-end region 320 of the private section 300, as shown at block 410. The VSM 235 proceeds to locate the first free block of storage residing at the current top of the user region 310 of the private section 300, as shown at block 415. For example, the VSM 235 locates the first free block of storage that is at least of a predetermined size. For example, the predetermined size may be configurable, and have a default value of 5 k, 10 k, 20 k, or any other size. The VSM 235 identifies the ending address of the first free block, as shown at block 420.

For example, the VSM 235 adds the size of the first free block to the start of the first free block to determine its ending address. The VSM 235 compares the ending address of the first free block with the ending address of the private section 300, as shown at decision block 430. Depending on the result of the comparison, the VSM 235 sets the Current Bottom of the High-end as the lower of the ending address of the first free block or the end of the Private Area less one, as shown at blocks 432 and 436. Thus, Current Bottom of High-end Region of Private Area=min(free block start address+free block size value, Private Area start address+Private Area size value−1), as shown at block 432 and 436. Also, Current Bottom of High-end Region of Extended Private Area=min(free block start address+free block size value, Extended Private Area start address+Extended Private Area size value−1).

The VSM 235 records the analytics data of the private section 300 of the user addressable virtual address space 110, thus acquired, outside the user addressable virtual address space 110, and in a common area above the boundary 150, as shown at block 440. Thus, in the above example, the VSM 235 records the analytics data for the private section 300 above the 2 G boundary. For example, the operating system 230 may allocate another address space that uses more than 31-bits, (for example a 64-bit address space) for the application. The VSM 235 may store the analytics data for the private section 300 in the corresponding address space above the boundary 150. In another example, the operating system 230 allocates a common area, above the boundary 150, to store the analytics data of the private sections of the user addressable virtual address spaces 110, 112, and 114. The VSM 235 stores the analytics data in the common area above the boundary 150, such as the 2 G mark. By storing the analytics data above the boundary 150, avoids contributing to virtual storage constraints, and subsequent exhaustion, in below the bar common area storage. In addition, storing the analytics data in the common virtual storage provides for easier accessibility at a much reduced performance cost.

Since the VSM 235 captures the analytics data as the storage request is actually being processed, the operating system 230 receives an accurate picture of how much storage is used within both the private area 130 (below 16 M) and the extended private area 132. The operating system 230 further receives an accurate picture of how much storage is owned by the user regions 310 and high-end regions 320 within each of the private area 130 and the extended private area 132. Analysis of the analytics data provides insight into which areas are responsible for possible storage failures within either area of the user region 310 and/or high-end region 320. Analysis over a period of time could provide insight into possible future out of storage incidents within the specific areas, and allow for proactive management of these areas to avoid the impact to the system from these possible private area storage problems.

Further, the operating system 230, or another analytics tool, may access the analytics data and provide a user interface to display the current status of the private section 300, such as illustrated by FIG. 3, to an administrator. The administrator may configure the private area, such as by tweaking the limits on the portions of the private section 300 to avoid system failures. For example, the administrator may configure the limit of the user region 310.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processing system comprising:
   a memory;
   a processor; and
   a virtual storage manager that manages a private section of a virtual address space allocated for a first application, wherein the virtual storage manager is configured to:
      determine a highest address corresponding to a user region of the private section, wherein the user region is a portion of the private section that is used for storing data and running programs in the virtual address space;
      determine a lowest address corresponding to a high-end region of the private section, wherein a storage in the user region is allocated from a first end of the private section towards the high-end region of the private section; and
      store analytics information in a common area of the memory, the common area being accessible by a second application, and wherein the analytics information comprises the highest address of the user region, the lowest address of the high-end region, a start address of the private section, and a size of the private section.

2. The processing system of claim 1, wherein the private section of the virtual address space is accessible only by the first application.

3. The processing system of claim 2, wherein the common area in which the analytics information is stored outside the virtual address space.

4. The processing system of claim 1, wherein the high-end region is a portion of the private section that is used for storing data structures associated with the virtual address space.

5. The processing system of claim 4, wherein a storage in the high-end region of the private section is allocated from a second end of the private section towards the user region of the private section.

6. The processing system of claim 1, wherein the private section is a private area or an extended private area of the virtual address space.

7. A computer product for providing real time analytics of a private section of a virtual address space, the computer product comprising a non-transitory computer readable storage medium that comprises computer executable instructions to:
- determine a start address and a size of the private section of the virtual address space, wherein that private section is accessible only by an application to which the virtual address space is assigned;
- determine a highest address corresponding to a user region of the private section, wherein the user region is a portion of the private section that is used for storing data and running programs in the virtual address space;
- determine a lowest address corresponding to a high-end region of the private section, wherein the high-end region is a portion of the private section that is used for storing data structures associated with the virtual address space; and
- store analytics information in a common area outside the virtual address space, wherein the analytics information comprises the start address and the size of the private section, the highest address of the user region, and the lowest address of the high-end region.

8. The computer product of claim 7, wherein the non-transitory computer readable storage medium further comprises instructions to:
- determine a current size of the user region of the private section;
- determine an ending address of a free block at the top of the user region; and
- assign as the lowest address corresponding to the high-end region of the private section, the ending address of the free block.

9. The computer product of claim 8, wherein the non-transitory computer readable storage medium further comprises instructions to:
- compare the ending address of the free block with an ending address of the private section; and
- assign as the lowest address corresponding to the high-end region of the private section, the ending address of the private section less one, in response to the ending address of the free block being greater than the ending address of the private section.

10. The computer product of claim 7, wherein a storage in the user region is allocated from a first end of the private section towards the high-end region of the private section.

* * * * *